M. DEILLER.
CLUTCH.
APPLICATION FILED MAR. 17, 1914.
1,176,438. Patented Mar. 21, 1916.
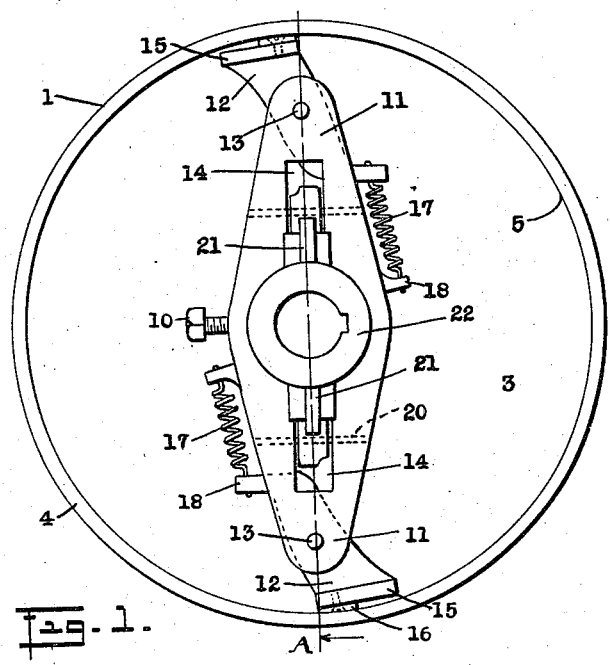
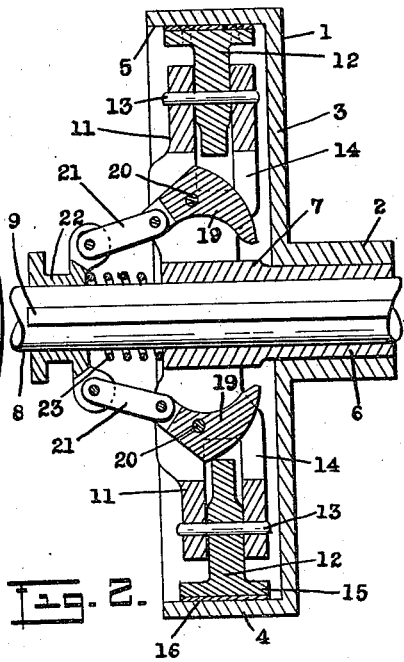
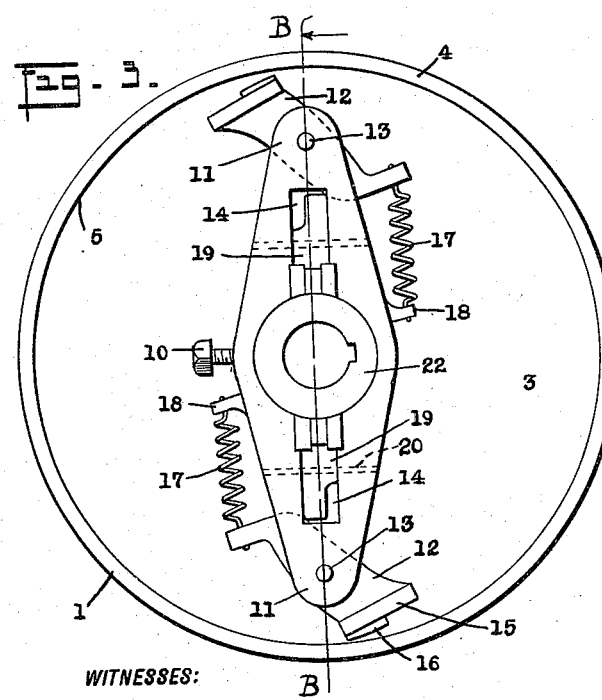
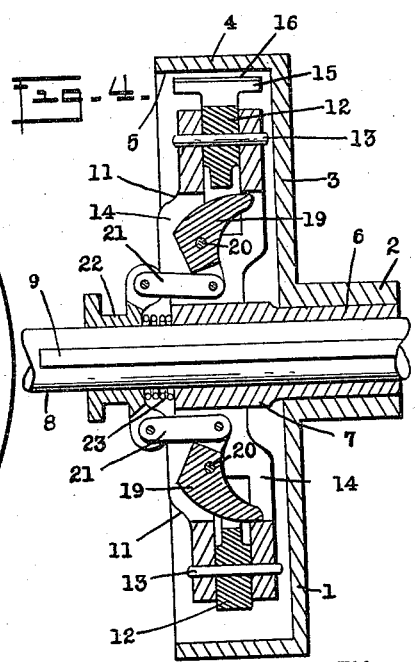
WITNESSES:
Howard P. King
Mildred E. Brooks
INVENTOR:
Martin Deiller
By Russell M. Everett
ATTORNEY.

UNITED STATES PATENT OFFICE.

MARTIN DEILLER, OF NEWARK, NEW JERSEY.

CLUTCH.

1,176,438.  Specification of Letters Patent.  Patented Mar. 21, 1916.

Application filed March 17, 1914. Serial No. 825,259.

*To all whom it may concern:*

Be it known that I, MARTIN DEILLER, a citizen of the United States, and a resident of Newark, in the county of Essex and State of New Jersey, have invented certain Improvements in Clutches, of which the following is a specification.

This invention relates more particularly to that class of clutches for connecting driving and driven members in which one of the clutch members has a plurality of shoes or contact pieces movable into or out of engagement with an annular friction surface provided by the other clutch member, and the objects of the invention are to provide an improved construction and combination of parts; to secure quick and positive connection between the driving and driven members; to pivot the shoes or contact pieces closely adjacent the friction surface in the plane of the driving and driven members; to normally hold said shoes in engagement with the friction surface by spring tension; to provide cam levers swinging in a direction transverse to the plane of the shoes for forcing said shoes out of engagement with said friction surface; to secure simplicity of construction and operation, and to obtain other advantages and results as may be brought out in the following description.

Referring to the accompanying drawings, in which like numerals of reference indicate the same parts throughout the several views, Figure 1 is a face view of the clutch thrown in so as to transmit motion; Fig. 2 is a sectional view on line A—A of Fig. 1; Fig. 3 is a view similar to Fig. 1, showing the clutch thrown out or idle, and Fig. 4 is a sectional view on line B—B thereof.

In the specific embodiment of the invention illustrated in said drawings, the reference numeral 1 indicates a pulley with a hub 2, disk or web 3 and cylindrical periphery or flange 4, said flange providing at its inner side an annular friction surface 5. This pulley 1 is mounted by its said hub 2 rotatably loose upon one end portion 6 of the hub 7 of a coöperating clutch member which is shown fast on a shaft 8 and preferably keyed thereto by a feather or spline 9 and also clamped against longitudinal movement by a set screw 10. From that portion 7 of the clutch member which lies within the chamber of the pulley, opposite arms 11, 11 project radially outward, each slotted at its opposite end in the plane of the pulley to receive a shoe 12 pivoted therein upon a pin 13, and also slotted transversely of the plane of the pulley between its hub and outer end, as at 14, said slots 14 extending into the slots 13 to expose the shoes, as shown. The ends of the arms 11, 11 extend closely adjacent to the flange 4 of the pulley, so that the shoes 12, 12 are at all times close to said flange and have only a short distance to move. Said shoes, when in engagement with the flange, lie oblique to a diametric line through their points of pivoting, as shown in Figs. 1 and 3, the inclination of the shoes outwardly toward the said flange being forward of the said diametric line with respect to the direction of rotation. The outer ends 15 of said shoes are broadened to form feet which are suitably padded as at 16 to engage the flange, and the inner end of each shoe receives a helical spring 17 attached at its other end to a lug 18 on the arm 11, which springs normally hold the shoes in gripping engagement with the friction surface 5.

For swinging the shoes 12 out of engagement with the friction surface 5, I pivot in the slot 14 of each of the arms 11 a bell-crank cam 19 adapted when swung upon its pivot 20 to engage the edge of the inner arm of the shoe and swing it upon its pivot. The cam 18 works in a plane of the shaft 8, substantially at right angles to the transverse plane in which the shoe works, and any thrust exerted through the shoe to the cam 19 is opposed principally by the walls of the slot 14 in which the cam is pivoted so that the thrust is not transmitted to the operator. These cams are fulcrumed so that their shoe-engaging ends are next the web 3 of the pulley.

In order to swing the cams, I pivot to their ends which project away from the web, links 21 the opposite ends of which are pivoted to a collar 22 slidably mounted upon the shaft 8 and feather or spline 9. Obviously by sliding this collar one way or the other on said shaft the links will swing the bell-crank cams, and in this particular construction when the collar is slid toward the pulley the cams swing at their engaging ends outwardly away from the axis of the pulley, (see Fig. 4), and operate to swing the shoes away from the friction surface of the pulley. As it is preferable to normally maintain engagement of the shoes with the friction surface, I have shown a spring 23 on the shaft 8 interposed between the collar 22 and the hub 7 to hold said collar away from the pulley, (see Fig. 2), unless positively slid toward it.

It will be understood that all the cam levers 19 have to do is swing the shoes 12 into idle position, and because of their cam surfaces acting wedgingly upon the inclined edges of the shoes this is easily and effectively done. Furthermore, as already pointed out, any reaction which tends to displace the cam levers longitudinally of their pivotal pins is resisted by the sides of the slots 14, and the links 21 have only to swing them.

Obviously, various detail modifications may be made in the form or structure of the different parts of my improved clutch without departing from the spirit and scope of the invention, and I do not wish to be understood as limiting myself except as required by the following claims when construed in the light of the prior art.

Having thus described the invention what I claim is:

1. In a clutch, the combination with driving and driven members one providing an annular friction surface and the other having an arm radially disposed with reference to said friction surface, of a shoe pivoted to said arm having one end projecting beyond the end thereof adapted to engage said friction surface and having its other end projecting laterally from said arm, a spring between said laterally projecting end and said arm member adapted to normally swing said shoe into engagement with said friction surface, and means for swinging said shoe out of engagement with said friction surface.

2. In a clutch, the combination with driving and driven members one providing an annular friction surface and the other having an arm radially disposed with reference to said friction surface, of a shoe pivoted to said arm having one end projecting beyond the end thereof adapted to engage said friction surface and having its other end projecting laterally from said arm, a spring between said laterally projecting end and said arm member adapted to normally swing said shoe into engagement with said friction surface, a cam for said shoe for swinging the same out of engagement with said friction surface, and means for operating said cam.

3. In a clutch, the combination with driving and driven members one providing an annular friction surface and the other having arms radially disposed with reference to said friction surface, of shoes pivoted to said arms each having one end projecting beyond the end of an arm adapted to engage said friction surface and having its other end projecting laterally from said arm, springs between said laterally projecting ends and said arm member adapted to normally swing said shoes into engagement with said friction surface, cams pivoted to swing transverse to said shoes adapted to engage the same for swinging said shoes out of engagement with said friction surface, and means for operating said cams at the same time.

4. In a clutch, the combination with driving and driven members, one providing an annular friction surface and the other having arms radially disposed with reference to said friction surface, of shoes pivoted to said arms, means for normally swinging said shoes into engagement with said friction surface, cams adapted to swing and engage said shoes for swinging the same out of engagement with said friction surface, a collar rotatably fast and longitudinally slidable on said shaft, and links pivoted to said collar and cams whereby moving the collar longitudinally of the shaft will swing said cams.

5. In a clutch, the combination with driving and driven members one providing an annular friction surface and the other having an arm radially disposed with reference to said friction surface, of a shoe pivoted on said arm to swing in substantially the same plane therewith transverse to the axis of rotation of the clutch members and engage the said friction surface to cause the clutch members to rotate together, said shoe being inclined with respect to radial lines of the clutch members through said shoe outwardly forward with respect to the direction of rotation of the clutch members, means for swinging said shoe in one direction, a cam lever on said other member adapted to swing in a plane transverse to that of the shoe and engage the same to swing it in the other direction, and means for swinging said cam lever.

6. In a clutch, the combination with driving and driven members one providing an annular friction surface and the other having arms radially disposed with reference to said friction surface, of a shoe pivoted on said arm to swing in substantially the same plane therewith and engage the annular surface, means for swinging said shoe in one direction, a cam lever pivoted on said arm to swing in a plane substantially perpendicular thereto and engage said shoe to swing in the other direction, and means for swinging said cam lever.

7. In a clutch, the combination with driving and driven members one providing an annular friction surface and the other having an arm radially disposed with reference to said friction surface, said arm being longitudinally slotted intermediate its ends transverse to the plane of said arm, of a shoe on the end of each arm adapted to engage the friction surface and cause the members to rotate together, means for swinging said shoe in one direction, a cam mounted in said slot of the arm and adapted to engage said shoe and swing it in the other direction, and means for operating said cam lever.

8. In a clutch, the combination with driving and driven members one providing an annular friction surface and the other having arms radially disposed with reference to said friction surface, said arms being each longitudinally slotted intermediate its ends transverse to the plane of said arms, of shoes pivoted one on the end of each arm to swing in substantially the plane of said arms and overlie the slot in the arm on which it is pivoted, said shoes adapted to engage the friction surface, means for swinging said shoes to normally engage said friction surface, cam levers mounted one in the slot of each arm and adapted to engage the shoe for swinging it out of engagement with said friction surface, and means for operating said cam levers.

9. In a clutch, the combination with driving and driven members one providing an annular friction surface and the other having arms radially disposed with reference to said friction surface, said arms being each longitudinally slotted intermediate its ends transverse to the plane of said arms, and recessed at its outer end in the plane of said arms, said slot and recess of each arm intersecting each other, of shoes fulcrumed one in the end recess of each arm and adapted to engage the friction surface, means for swinging said shoes to normally engage said friction surface, cam levers mounted one in the slot of each arm and adapted to engage the shoe for swinging it out of engagement with said friction surface, and means for operating said cam levers.

MARTIN DEILLER.

Witnesses:
HOWARD P. KING,
JANET A. AYERS.

Copies of this patent may be obtained for five cents each, by addressing the "Commissioner of Patents, Washington, D. C."